United States Patent [19]

La Croix

[11] 4,003,341
[45] Jan. 18, 1977

[54] GROOMING STAND FOR PETS

[76] Inventor: Francis A. La Croix, 436 Pearl St., Marine City, Mich. 48039

[22] Filed: July 3, 1975

[21] Appl. No.: 593,033

[52] U.S. Cl. ............................................. 119/103
[51] Int. Cl.² ......................................... A61D 3/00
[58] Field of Search .................... 119/103, 102, 96

[56] References Cited
UNITED STATES PATENTS

| 3,092,079 | 6/1963 | Strebel et al. | 119/103 |
| 3,120,836 | 2/1964 | Brauning | 119/103 |
| 3,250,252 | 5/1966 | Leopold | 119/103 |
| 3,524,434 | 8/1970 | Finley | 119/103 |

Primary Examiner—Hugh R. Chamblee
Attorney, Agent, or Firm—Adolph G. Martin

[57] ABSTRACT

A grooming stand for pets having a pedestal with a stationary base and a multi-position table rotatably mounted thereon. A vertically adjustable upright post, mounted on the rotatable table, supports a cradle for holding the pet. The cradle has a front portion and a rear portion connected together by longitudinally adjustable means. Upwardly disposed sides on both the front and rear portions of the cradle have thereon straps for restraining the pet while it is being groomed.

2 Claims, 9 Drawing Figures

U.S. Patent    Jan. 18, 1977    4,003,341
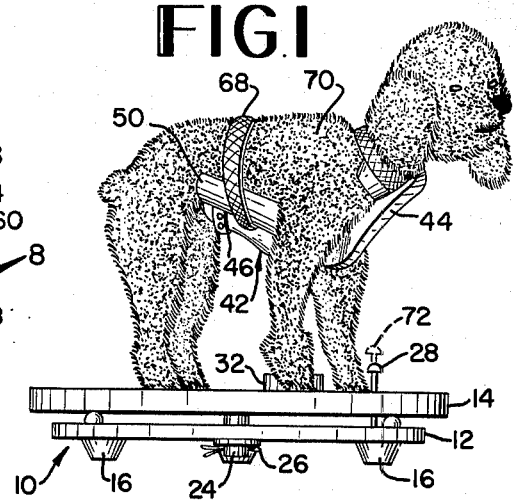
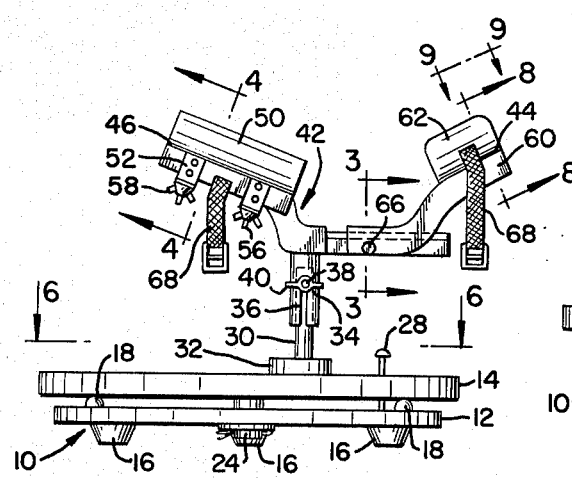
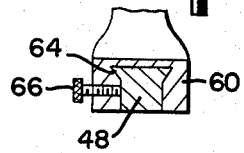
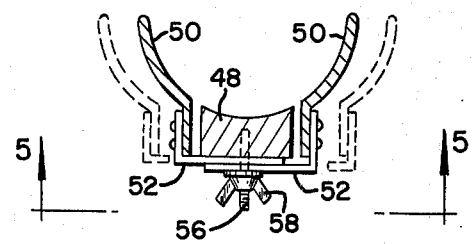
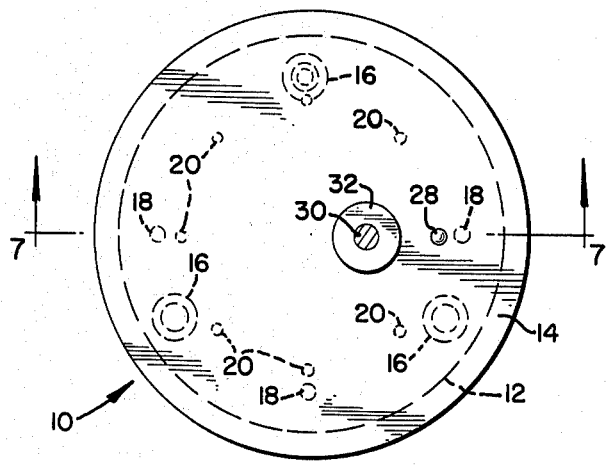
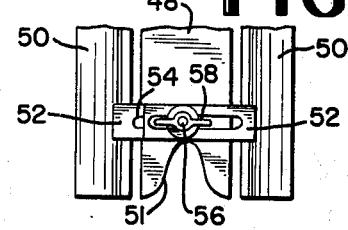
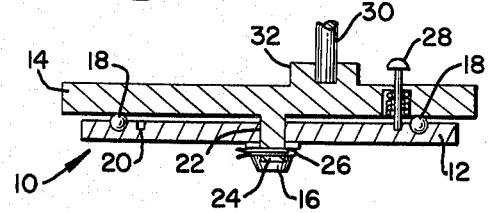
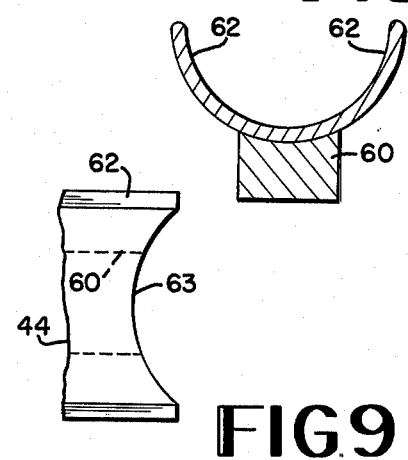

4,003,341

GROOMING STAND FOR PETS

BACKGROUND OF THE INVENTION

This invention relates generally to devices for restraining pets during a grooming operation, and more particularly to a grooming stand having a multiposition rotatable for holdably supporting the pet. Most such devices presently in use, are uncomfortable for the pet, and consequently cause him to become restless and agitated. As a result the grooming operation is a lengthy procedure, and an ordeal for both the operator and pet. Fully cognizant of this situation, the applicant has developed a grooming stand which can be readily adjusted to comfortably support the pet, and enable it to be conveniently positioned to expedite the grooming procedure.

SUMMARY OF THE INVENTION

This invention consists of a pedestal 10 having a stationary base 12 and a multi-position round table 14 rotatably mounted thereon. An adjustable upright member on the table 14 supports a cradle 42 having a front portion 44 and a rear portion 46. The rear portion 46 of the cradle 42 has an elongated member 48 and upwardly disposed sides 50 which are laterally adjustable. The front portion 44 of the cradle 42 is slidably mounted on the elongated member 48, and provided with upwardly disposed sides 62. Adjustable straps 68 are attached to the front and rear portions 44 and 46 of the cradle 42.

DESCRIPTION OF THE DRAWING

FIG. 1 is a side elevation view, showing te applicant's grooming stand with a pet 70 holdably supported in the cradle 42.

FIG. 2 is a side elevation view of the applicant's grooming stand showing structural details of the cradle 42.

FIG. 3 is an enlarged section view, taken substantially on plane 3—3 in FIG. 2, showing the locking screw 66 in the central member 60 on the forward portion 44 of the cradle 42.

FIG. 4 is an enlarged section view, taken substantially on plane 4—4 in FIG. 2, showing structural details of the laterally adjustable side members 50 on the rear portion 46 of the cradle 42.

FIG. 5 is an enlarged plan view, taken substantially on plane 5—5 in FIG. 4, showing the elongated slots 54 in the lateral members 52 on the upwardly disposed sides 50.

FIG. 6 is a section view, taken substantially on plane 6—6 in FIG. 2, showing the four balls 18 and spaced holes 20 in the stationary base 12 of the pedestal 10.

FIG. 7 is a section view, taken substantially on plane 7—7 in FIG. 6, showing structural details of the locking pin 28 in the round table 14.

FIG. 8 is an enlarged section view, taken substantially on plane 8—8 in FIG. 2, showing the characteristic shape of the side members 62 on the front portion 44 of the cradle 42.

FIG. 9 is an enlarged section view, taken substantially on plane 9—9 in FIG. 2, showing the concavity 63 in the forward end on the front portion 44 of the cradle 42.

CONSTRUCTION

For a more detailed description of the invention, reference is made to the drawing in whcih numeral 10 designates a pedestal having a stationary base 12 and a round table 14. Three spaced feet 16 are provided on the lower side of the stationary base 12. A series of balls 18 are rollably mounted in the upper face of the stationary base 12 which also has therein an annular array of openings 20 and a center opening 22.

The round table 14, rotatably supported on the balls 18, has thereon a downwardly disposed shaft 24 extending through the center opening 22 in the stationary base 12. A cotter pin 26, through the lower end of the shaft 24, secures the round table 14 on the stationary base 12. A spring loaded locking pin 28, in the round table 14, extends downwardly for selective holding engagement in the annular array of openings 20 in the upper face of the stationary base 12.

An upright post 30 is secured in an eccentrically located hub 32 on the upper side of the round table 14. A tubular sleeve 34, with a longitudinal slot 36 therein, is slidably supported on the upright post 30. A threaded stud 38 in the upright post 30 extends through the longitudinal slot 36 in the tubular sleeve 34. A wing nut 40, on the threaded stud 38, adjustably holds the tubular sleeve 34 on the upright post 30.

A cradle 42, having a front portion 44 and a rear portion 46, is supported on the upper end of the tubular sleeve 34. The rear portion 46 of the cradle 42 has an elongated member 48 attached to the tubular sleeve 34, and upowardly disposed sides 50. The elongated member 48, has in the end thereof, a U shaped notch 51, as shown in FIG. 5. The sides 50 each have a pair of oppositely disposed lateral members 52 in sliding engagement with each other, and having therein vertically aligned longitudinal slots 54.

Two downwardly extending threaded studs 56 in the elongated member 48 project through the vertically aligned longitudinal slots 54 in the lateral members 52. Wing nuts 58, on the threaded studs 56, adjustably hold the upwardly disposed sides 50 on the elongated member 48. The front portion 44 of the cradle 42 has a central member 60, with upwardly disposed sides 62 thereto attached, and a concavity 63 in the forward end.

The central member 60 has therein a dove tail slot 64 slidably engaged on the elongated member 48, as shown in FIG. 3 of the drawing. A locking screw 66 is provided in the central member 60 for holdably engaging the elongated member 48 on the front portion 46 of the cradle 42. Adjustable straps 68 are attached to both the front and rear portions, 44 and 46 respectively of the cradle 42.

The preceding discussion completes a description of the structure characterizing the single embodiment of the applicant's invention herein disclosed; however, to facilitate a more thorough and comprehensive understanding of the subject matter, a discussion of the manner in which the device is used to fulfill its intended function is immediately hereinafter set forth.

USE AND OPERATION

In use, the pet 70 to be groomed is placed on the applicant's stand, as illustrated in FIG. 1 of the drawing. The wing nut 40 on the threaded stud 38 is then loosened and the cradle 42 vertically adjusted so that the pet's feet can rest comfortably on the table 14. The wing nuts 58 on the two threaded studs 56 in the elongated member 48 are next loosened and the upwardly disposed sides 50 laterally adjusted to restrain the pet 70. The locking screw 66 in the central member 60 is then loosened and the front portion 44 of the cradle 42 longitudinally positioned to comfortably support the chest and neck of the pet 70.

The wing nuts 58 and the locking screw 66 are next tightened so as to hold the front and rear portions, 44 and 46 respectively of the cradle 42, in their adjusted positions. The adjustable straps 68 are then secured around the pet 70 so as to hold it in the cradle 42. The spring loaded locking pin 28 in the round table 14 is next elevated to its retracted position, shown by the broken lines 72 in FIG. 1. The round table 14 is then rotated to place the pet 70 in the approximate position desired.

The spring loaded pin 28 is then released, and the table 14 further pivoted until the pin 28 engages one of the openings 20 in the upper face of the stationary base 12, thereby lockig the table 14 in position. The operator may then proceed to groom the pet 70, moving the table 14 only when required to place the pet 70 in a more advantageous position to facilitate the grooming operation. It should be readily apparent that the applicant's stand, when used in the manner described, greatly simplifies the grooming procedure, and makes it far less time consuming.

Therefore, based upon the foregoing discussion, the applicant is of the opinion that his invention has fulfilled a long-felt need in the field of grooming aids for pets, and that he has accordingly made a valuable contribution to the related art. The invention, however, was described with reference to the structural details of only a single embodiment, but it should be appreciated by those familiar with the art, that the principles involved are susceptible of numerous other practical adaptations.

I therefore claim as new, and desire to secure by Letters Patent:

1. A grooming stand for pets comprising a stationary base, a series of balls rollably mounted in the upper side of the stationary base, a table rotatably supported on the balls, an annular array of openings in the upper side of the stationary base, a spring loaded locking pin in the rotatable table for selective engagement in the annular array of openings in the stationary base, a vertically adjustable upright support on the rotatable table, and a cradle on the upright support for holdably receiving a pet.

2. The grooming stand of claim 1 in which the upright support is eccentrically positioned on the rotatable table.

* * * * *